United States Patent [19]
Bukoschek et al.

[11] Patent Number: 4,506,178
[45] Date of Patent: Mar. 19, 1985

[54] RETURN STOP FOR A SELF-STARTING SYNCHRONOUS MOTOR

[75] Inventors: Romuald L. Bukoschek; Peter Steiner, both of Klagenfurt, Austria

[73] Assignee: U.S. Philips Corporation, New York, N.Y.

[21] Appl. No.: 551,765

[22] Filed: Nov. 14, 1983

[30] Foreign Application Priority Data

Jan. 27, 1983 [AT] Austria .................................. 270/83

[51] Int. Cl.³ ............................................. H02K 7/10
[52] U.S. Cl. ....................................... 310/41; 310/74; 310/84
[58] Field of Search ...................... 310/41, 42, 51, 74, 310/84

[56] References Cited
U.S. PATENT DOCUMENTS

| | | | |
|---|---|---|---|
| 2,633,950 | 4/1953 | Phaneuf | 310/41 X |
| 3,826,934 | 7/1974 | Leach | 310/41 |
| 4,296,341 | 10/1981 | Guttinger | 310/41 |

*Primary Examiner*—Mark O. Budd
*Attorney, Agent, or Firm*—Robert S. Smith

[57] ABSTRACT

Figure 1:
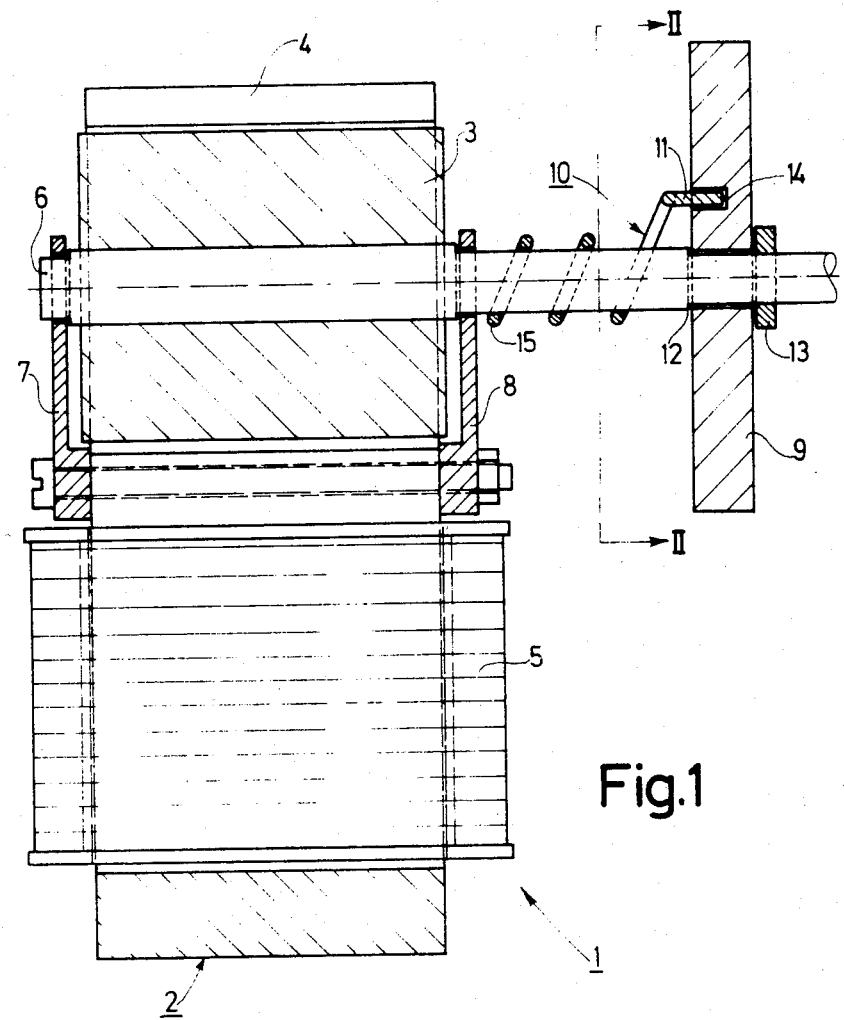

In a return stop for a self-starting synchronous motor (1) having an inert mass (9) which is arranged coaxially with a shaft (6) operatively connected to the motor, is rotatable with respect to the shaft, is positioned on the shaft in axial direction and is coupled to the shaft via a helical spring (10) extending coaxially with the shaft, one end (11) of the helical spring being fixedly connected to the inert mass, it is ensured that the helical spring is loosely disposed on the shaft together with the inert mass, the helical spring being connected to the shaft solely by means of friction contact (FIG. 1).

1 Claim, 2 Drawing Figures

RETURN STOP FOR A SELF-STARTING SYNCHRONOUS MOTOR

The invention relates to a return stop for a self-starting synchronous motor with an inert mass which (1) is arranged coaxially with a shaft operatively connected to the motor, (2) is rotatable with respect to the shaft, (3) is positioned in axial direction on the shaft and (4) is coupled to the shaft by means of a helical spring extending coaxially with the shaft. One end of the helical spring is fixedly connected to the inert mass.

In such a return stop known from DE-OS No. 2407079, inter alia in addition to the end of the helical spring connected to the inert mass the other end of this spring is fixedly connected to the shaft through a clamping member. The operation of this known return stop is based on the fact that, when the motor starts in the undesired direction of rotation, the helical spring is immediately operatively connected to the inert mass, a result of which due to the fixed connection of the helical spring with the shaft the inert mass is directly coupled to the shaft, which results in that a strong inhibition of rotation is obtained which prevents the motor from starting in this direction of rotation. On the contrary, when the motor starts in the other desired direction of rotation, the helical spring is first wound and is thus operatively connected with delay to the inert mass and takes it along, which means that the motor can start in this direction of rotation because it is not immediately prevented from doing so by a strong inhibition of rotation. Due to the fixed connection of both ends of a helical spring on the one hand to the inert mass and on the other hand to the shaft, slipping of the helical spring is not possuble in either of the two directions of rotation, but this spring is constantly fixedly connected not only to the inert mass, but also to the shaft.

The invention has for its object to provide a simplification of the construction of a return stop of the kind mentioned in the opening paragraph and to construct it further so that it can operate especially also as a slip coupling. According to the invention, it is ensured for this purpose that the helical spring is loosely disposed on the shaft together with the inert mass, the helical spring being connected to the shaft solely by friction contact. Thus, it is achieved that, when the motor starts in the undesired direction of rotation, the helical spring is immediately contracted around the shaft and so the inert mass is coupled directly to the shaft, as a result of which a strong inhibition of rotation is obtained, which prevents the motor from starting in this direction of rotation, whereas, when the motor starts in the other desired direction of rotation, the helical spring is first slightly opened and, whilst slipping on the shaft, takes along the inert mass only with delay, which renders it possible for the motor to start in this direction of rotation because there is directly no strong inhibition of rotation. Such a slipping of the helical spring on the shaft occurs until the inert mass rotates synchronously with the speed of rotation of the shaft, whereby the helical spring has then contracted again to its starting position and is taken along by the shaft without slipping. However, due to the fact that the helical spring is not fixedly connected to the shaft, the possibility of slipping, viewed from the shaft, in the desired direction of rotation subsists, in which event the helical spring would be slightly opened again. Thus, the helical spring in addition fulfills the function of a slip coupling, which is advantageous, for example, when the rotation of the inert mass is inhibited by undesired influences, whereby no damage can occur. It appears that moreover the construction of such a return stop is particularly simple because the helical spring can be simply disposed loosely on the shaft together with the inert mass.

It should now be noted that the AT-PS No. 221168 already discloses a return stop in which a helical spring is arranged on a shaft by friction contact, one end of the helical spring being fixedly held. The operation of this return stop is based on the fact that, when the motor starts in the undesired direction of rotation, the helical spring fixedly held at one end is immediately contracted around the shaft, as a result of which the friction contact is so delayed that the motor cannot start in this direction of rotation. In the other desired direction of rotation the helical spring is slightly opened so that the shaft can slip along, which renders it possible for the motor to start in this direction of rotation. However, such a return stop has the disadvantage that the helical spring in the desired direction of rotation of the motor permanently loads the motor additionally by the constant slipping of the shaft, which is not the case in the return stop described above in accordance with the invention. The function of a slip coupling in co-operation with an inert mass is not given here either because the helical spring is fixedly held at one end.

Figure 2:
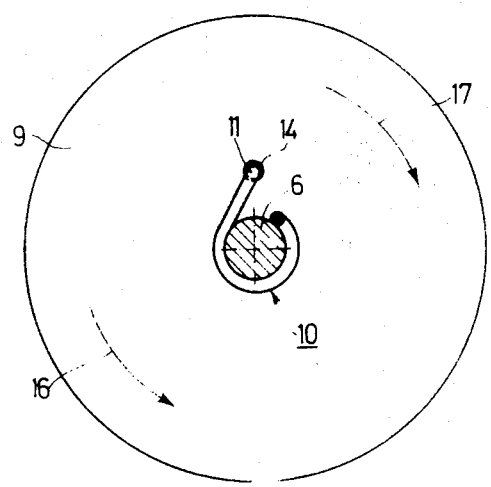

The invention will be described more fully hereinafter with reference to the drawing, which shows an embodiment of the invention, to which it is not limited, however. FIG. 1 shows a cross-section of a synchronous motor, on the shaft of which a return stop constituted by an inert mass and a helical spring is loosely disposed. FIG. 2 is a sectional view taken on the line II—II in FIG. 1.

In FIG. 1, reference numeral 1 designates a self-starting synchronous motor, which has a U-shaped stator 2 and a cylindrical permanent magnetic rotor 3. The two limbs of the U-shaped stator 2, of which a limb 4 is shown in FIG. 1, each carry an energizing winding 5 and enclose in the range of their free ends the rotor 3 whilst each forming an air gap along an arc over a predetermined angular range, as a result of which two pole pieces co-operating with the rotor are formed. The rotor 3 is disposed on a shaft 6 which drives an external load not shown here further and is journalled in two bearing shields 7 and 8 connected to the stator 2. The rotor 3 in the form of a permanent magnet is magnetized diametrically so that it has at its peripheral surface oppositely arranged N and S poles each co-operating with the two pole pieces of the stator 2. The present synchronous motor is consequently a so-called bipolar self-starting single phase synchronous motor having a permanent magnetic rotor which is diametrically magnetized. Such motors are frequently used in small domestic devices, such as, for example, citrus fruit squeezers, tin openers, knife sharpeners and the like. By shaping the air gaps between the pole pieces of the stator 2 and the rotor 3 in a corresponding manner, when the stator 2 is not energized, a predetermined rest position with respect to the rotor 3 is defined, from which the rotor can start to rotate in one of the two directions of rotation if the load acting upon it is not too large. The direction of rotation in which the rotor actually starts to rotate is not defined, but depends upon the instantaneous magnetic field conditions. The fact that such a motor may arbitrarily start in both directions of rotation is undesirable for various applications for which a given direction of rotation is aimed at, and this is the reason why such motors are provided with a return stop which permits the motor of starting only in a given direction of rotation.

Already a series of embodiments of such return stops have become known. The present return stop is a return stop utilizing various load conditions during the operation of starting the motor and having an inert mass 9 which is arranged coaxially with a shaft 6 operatively connected to the motor, is rotatable with respect to the shaft, is positioned in axial direction on the shaft and is coupled to the shaft by means of a helical spring 10 extending coaxially with the shaft, one end 11 of the helical spring 10 being fixedly connected to the inert mass 9. In the present embodiment, the shaft 6 with which the return stop co-operates is the very motor shaft on which the rotor 3 of the motor 1 is disposed. However, a return stop could alternatively co-operate with a shaft which is operatively connected via a gear to the motor shaft proper when this gear transmits various load conditions to the motor shaft in a suitable manner. The inert mass 9, which in the present case is constituted by a disk, is rotatable with respect to the shaft 6, but is positioned on it in axial direction, for which purpose it is enclosed laterally on the one hand by a shoulder 12 on the motor shaft 6 and on the other hand by a clamping ring 13 slipped onto the motor shaft 6. Of course, such a positioning of the inert mass could also be realized by means of other measures known for such purposes. The end 11 of the helical spring 10 in the present case is fixedly connected to the inert mass 9 in that it is inserted and clamped, respectively, into a recess 14 in the inert mass 9. Of course, there are alternative means for realizing such as a fixed connection between the end 11 of the helical spring 10 and the inert mass 9, such as, for example, a screw connection.

In such a return stop, it is ensured that the helical spring 10 is disposed loosely on the shaft 6 together with the inert mass 9, the helical spring 10 being connected to the shaft 6 solely by friction contact. So this means that the helical spring 10 is fixedly connected to the inert mass 9 only by its end 11, whereas its other end 15 is not fixedly connected to the shaft 6, but only encloses the latter. Therefore, the helical spring 10 is connected to the shaft 6 solely by friction contact. The required degree of friction contact between the helical spring 10 and the shaft 6 depends on the one hand upon the power of the motor 1 and the other hand upon the size of the inert mass 9 to be coupled so that the latter is taken along in the desired direction of rotation only with delay, the size of the inert mass 9 itself being chosen in known manner so that, when it is directly coupled, it prevents starting in the undesired dirction of rotation by a correspondingly strong inhibition of rotation. Which of the two directions of rotation is the undesired direction of rotation and which is the desired direction of rotation, depends upon the direction in which the turns of the helical spring 10 enclose the shaft 6, whereby that direction of rotation of the shaft which causes the turns of the helical spring to be contracted corresponds to the blocking direction.

The operation of the return stop described above is as follows. If the rotor 3 of the motor 1 intends to start in the direction of rotation indicated in FIG. 2 by the arrow 16 shown in broken lines, the shaft 6 exerts via the friction contact with the helical spring 10 a force on it which causes the turns of the helical spring to contract around the shaft. This results in that the inert mass 9 is directly coupled to the shaft 6, which with a corresponding size of the latter prevents that the rotor 3 can rotate in this direction of rotation because the inhibition of rotation is too strong. If, however, the rotor 3 starts to rotate in the direction of rotation indicated in FIG. 2 by the arrow 17 shown in full lines, the shaft 6 exerts via the friction contact with the helical spring 10 a force on it which causes the turns of the helical spring around the shaft to be slightly opened so that up to a certain degree slipping occurs between the shaft 6 and the helical spring 10, which results in that the inert mass 9 is taken along by the helical spring 10 only with delay. However, this means that the inhibition of rotation to which the rotor 3 is subjected by the inert mass 9 is now so weak that the rotor can rotate in this direction of rotation. As soon as starting in this direction of rotation has taken place, the inert mass 9 is increasingly accelerated until it rotates synchronously with the rotor 3 and the shaft 6, respectively. In this process, slipping between the shaft 6 and the helical spring 10 is increasingly reduced, the turns of the helical spring 10 again enclosing the shaft 6 more tightly until the original friction contact is reached, in which event slipping between the shaft 6 and the helical spring 10 then no longer occurs and consequently an additional load is not exerted on the motor either.

Such a return stop has a very simple construction because the inert mass together with the helical spring can be disposed on the shaft in a simple manner. Due to this simple construction, also a very high operational and functional reliability is obtained.

Further, such a return stop has the property that the effect of a slip coupling can occur between the shaft 6 and the helical spring 10 on the one hand in the desired direction of rotation, viewed from the rotor 3 and the shaft 6, respectively, and on the other hand in the reverse direction of rotation, viewed from the inert mass 9, which is due to the fact that the helical spring is disposed only loosely on the shaft and is connected thereto solely by friction contact so that slipping between the shaft 6 and the helical spring 10 is possible. This has the advantage that, when, for example, the inert mass 9 is inhibited to rotate by undesired influences during operation of the motor, no damage can occur because in such a case the slip coupling effect between the helical spring 10 and the shaft 6 occurs immediately. This is due to the fact that from the end 11 of the helical spring 10 a force is exerted on the helical spring which serves to open the turns of the helical spring so that slipping with respect to the shaft 6 can occur. Such a slip coupling effect is especially advantageous when the inert mass itself constitutes the external load to be driven by the motor because in such a case it may happen that the external load is blocked under overload conditions. If, for example, the inert mass is directly constructed as a fan wheel of a ventilator, any risk of injury or damage is thus excluded when a person enters, for example with his hand or with a solid object, into the range of the rotating fan wheel because the fan wheel is then stopped immediately due to the slip coupling effect.

As appears from the foregoing, a series of modifications of the embodiment described are possible without departing from the scope of the invention. In this connection, it is especially to be stated that such a return stop may of course also advantageously be used in self-starting synchronous motors of a construction different from that described above, such as synchronous motors comprising multipole stators and rotors or differently constructed stators and rotors according to the prior art.

What is claimed is:

1. A self-starting synchronous motor having return stop means limiting the direction of rotation to only a single predetermined direction, said means consisting of an inert mass which is arranged coaxially with a shaft operatively connected to the motor, is rotatable with respect to the shaft, extends along the shaft in an axial direction and is coupled to the shaft via a helical spring extending coaxially with the shaft, one end of the helical spring being fixedly connected to the inert mass, the helical spring is loosely disposed on the shaft together with the inert mass, the helical spring being connected to the shaft solely by means of friction contact.

* * * * *